(No Model.) 2 Sheets—Sheet 1.

B. SCHEITHAUER.
GALVANIC BATTERY.

No. 396,342. Patented Jan. 15, 1889.

Witnesses.
Inventor.
B. Scheithauer
By his Atty (No Model.) 2 Sheets—Sheet 2.

B. SCHEITHAUER.
GALVANIC BATTERY.

No. 396,342. Patented Jan. 15, 1889.

Witnesses.

Inventor.
B. Scheithauer,
by
his Att'y

UNITED STATES PATENT OFFICE.

BERNHARD SCHEITHAUER, OF HALLE-ON-THE-SAALE, GERMANY.

GALVANIC BATTERY.

SPECIFICATION forming part of Letters Patent No. 396,342, dated January 15, 1889.

Application filed December 5, 1887. Serial No. 257,013. (No model.)

*To all whom it may concern:*

Be it known that I, BERNHARD SCHEITHAUER, a subject of the Emperor of Germany, and a resident of Halle-on-the-Saale, Germany, have invented a new and useful Improvement in Primary Batteries, of which the following is a specification.

This invention relates to galvanic batteries, and its object is to produce a battery capable of giving a constant current and one which shall at the same time be inexpensive in maintenance.

The improvement relates, principally, to the prevention of polarization by causing the hydrogen collecting on the carbon plates to be removed by means of chlorine gas, the latter combining with hydrogen to form hydrochloric acid, which is also utilized for the further production of chlorine, in the manner described.

The accompanying drawings illustrate in several forms batteries, all based upon the improvement above described.

Figure 1:
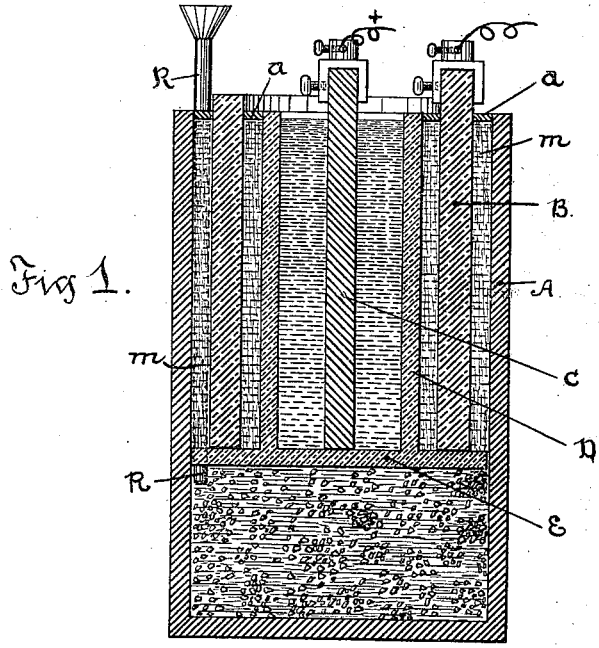
Figure 2:
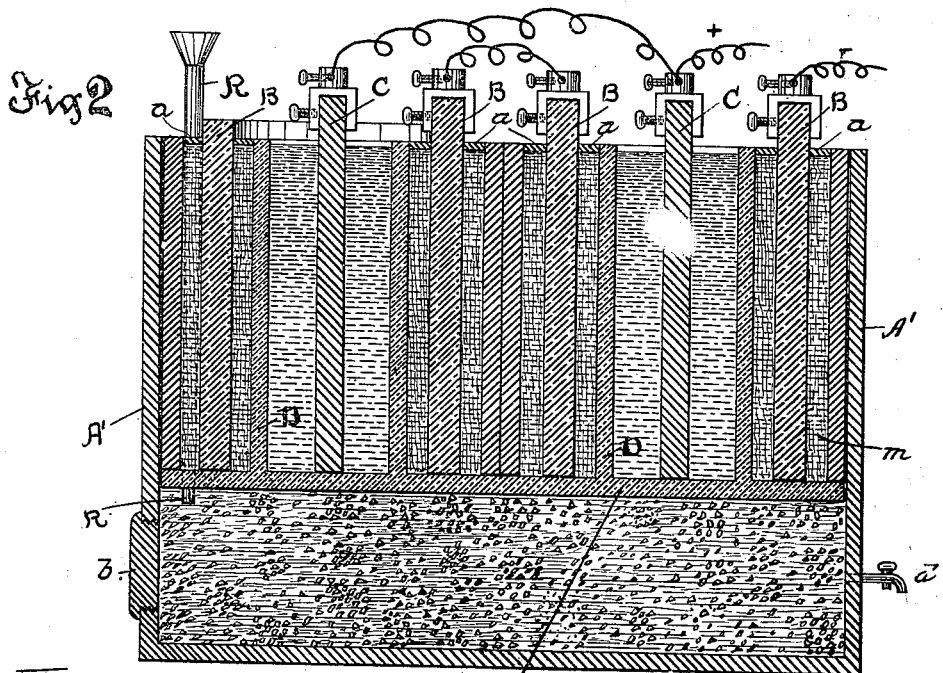
Figure 3:
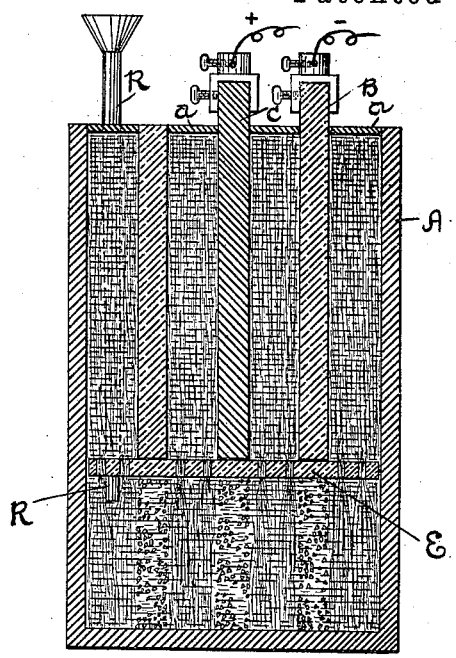
Figure 4:
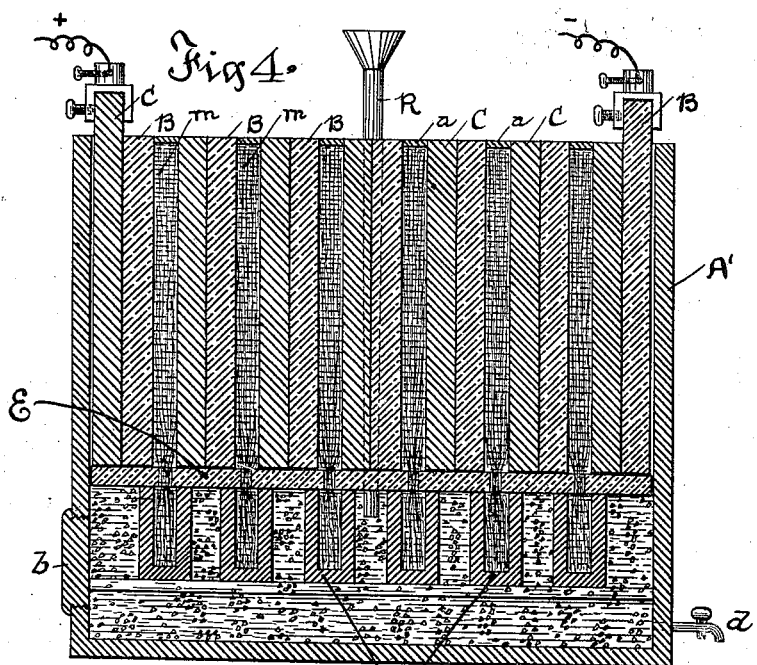

Figure 1 is a vertical section of a one-cell battery with diaphragm. Fig. 2 is a similar view of a two-cell battery with diaphragm; Fig. 3, a single-cell battery without diaphragm; Fig. 4, a series of cells arranged without diaphragms in the manner of a voltaic pile.

A is a jar, of glass, porcelain, earthenware, or the like, such as is usually employed for the cells of galvanic batteries, but preferably of somewhat greater depth in proportion to its breadth.

B is a plate or plates, of carbon, copper, or other metal or material usually employed for negative plates.

C is a pillar or plate of zinc, forming the positive plate.

D is a diaphragm or porous jar surrounding the zinc plate in the known manner. The positive and negative plates and diaphragm aforesaid are supported upon a perforated wall, E, extending across the jar A and dividing the latter into two parts.

R is a thistle-tube extending downward into the jar A, and terminating at a short distance below the wall E. The lower part of the jar A, below the wall E, is filled with a mixture of chloride of lime, common salt, and manganese. The space about the negative plate is packed with asbestus, m, and the space about the zinc plate is filled with water. The space about the negative plate is also preferably hermetically closed above by disks or plates a, of vulcanite or the like.

In practice I prefer to make the wall E as a part with the diaphragm D in a simple element, as shown in Fig. 1, and to leave that part of the wall E which is situated under and forms a bottom to the cell formed by the diaphragm D unperforated, to prevent the direct connection between this portion of the cell and the mixture below the wall E.

In the battery shown in Fig. 2 the trough A' is made of sufficient size to contain all the cells, and the lower part thereof is filled with the aforesaid mixture. The wall E will then extend in one piece across the whole extent of the trough, and the cell-walls A and diaphragms D will be formed without bottoms and caused to rest upon the wall E. To facilitate the filling of the mixture into the lower part of the receptacle A', the wall thereof may be provided with a comparatively large opening closed by a screw-plug, b, or the like. A tap, d, may likewise be arranged for drawing off the liquid from the trough.

The battery shown in Fig. 3 is a single cell without diaphragm. In this battery the spaces between the plates are packed with asbestus, as well as the space about the carbon plate, and the asbestus is caused to extend downward more or less into the bottom of the jar A—that is to say, asbestus is placed therein between portions of the mixture before described in correspondence with the asbestus above the wall E; also, in the battery shown in Fig. 4 diaphragms are dispensed with, the plates being arranged in pairs, with layers of asbestus fiber between each pair, said layers extending downward into vessels F, containing water.

For bringing the battery into action hydrochloric acid is poured into the thistle-tube R, and thus into the lower space of the trough A' or jar A, where it acts upon the mixture therein contained to form chlorine gas, the said gas ascending among the asbestus fiber about the negative plates. The hydrogen forming on said plates is thus brought into intimate contact with the chlorine, and combines therewith to form hydrochloric acid, which sinks into the lower part of the vessel and acts upon the mixture therein. The water moistens the asbestus, and, becoming more or less acid from the dissolved hydrochloric-acid gas formed, reacts on the zinc.

Having described my invention, I claim and desire to secure by Letters Patent—

1. In a galvanic battery, the combination of a receptacle having a horizontal perforated wall, negative and positive plates above said wall, and a mixture adapted to evolve chlorine below said wall, with a liquid or liquids suitable for exciting said battery and production of chlorine, substantially as set forth.

2. The combination of a receptacle having a horizontal perforated wall, negative and positive plates above said wall, asbestus fiber about the negative plate or plates, and a mixture adapted to evolve chlorine below said wall, with liquid or liquids for exciting said battery and production of chlorine, substantially as and for the purpose set forth.

In testimony whereof I have signed this specification in the presence of two subscribing witnesses.

BERNHARD SCHEITHAUER.

Witnesses:
 EDMUND ZACH,
 MAX MATTHÄI.